July 7, 1970
R. ENGEL ET AL
3,519,384
METHOD OF REMOVING CO$_2$ AND H$_2$O FROM A GAS STREAM
Filed Aug. 15, 1966
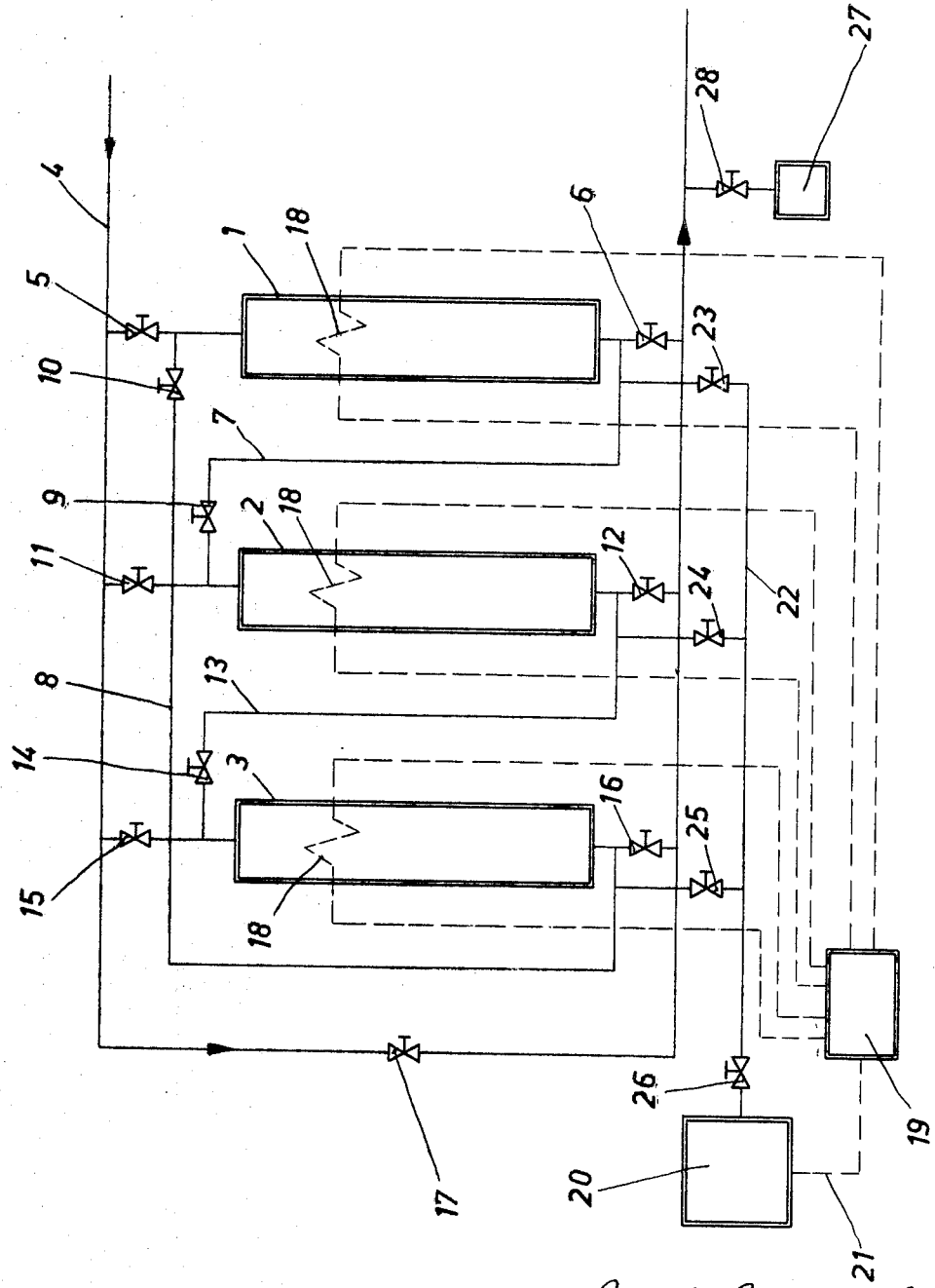
Rudolf Engel and
Claus-Benedikt von der Decken
Inventors
By Wenderoth, Lind and Ponack
Attorneys

United States Patent Office 3,519,384
Patented July 7, 1970

3,519,384
METHOD OF REMOVING $CO_2$ AND $H_2O$ FROM A GAS STREAM
Rudolf Engel, Aachen, and Claus-Benedikt von der Decken, Verlautenheide, Aachen, Germany, assignors to Brown Boveri/Krupp Reaktorbau G.m.b.H., Dusseldorf, Germany
Filed Aug. 15, 1966, Ser. No. 572,477
Claims priority, application Germany, Aug. 19, 1965, B 83,293
Int. Cl. B01d 53/04
U.S. Cl. 23—2
6 Claims

ABSTRACT OF THE DISCLOSURE

A method of removing $CO_2$ and $H_2O$ from a gas stream in which three absorption filter elements are used. The first filter element initially contains $Ca(OH)_2$ and the second and third filter elements initially CaO. The method comprises initially passing the gas stream sequentially through the first and second filter elements which operate respectively as a $CO_2$ absorption filter and as an $H_2O$ absorption filter, converting the $Ca(OH)_2$ and the CaO respectively to $CaCO_3$ and $Ca(OH)_2$. The third absorption filter element is kept in reserve until the first filter element is exhausted; at this time the gas is cycled sequentially through the second filter element, which now contains $Ca(OH)_2$, and the third filter element. The first filter element may now be charged with CaO and held in reserve to act as an $H_2O$ absorption filter when the second filter element is exhausted.

---

This invention relates to a method of removing $CO_2$ and $H_2O$ from a gas stream.

The present invention is concerned with such a method in which lime is used as an absorbent in several mutually disconnectable absorbent filter elements which can be selectably interposed in the gas stream.

Many processes performed in industrial plant involve the formation of more or less considerable volumes of $CO_2$ which adversely affect the further course of the process, and which are not therefore desirable. For instance, in a nuclear reactor the reaction of graphite with oxygen or of graphite with water continuously leads to the formation of CO and $CO_2$ which then contaminates the gaseous coolant circulating through the reactor. By oxidation, the CO can be readily converted to $CO_2$ and the latter can be removed from the coolant system by a reaction with lime according to the equation

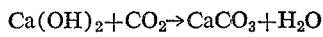

$$Ca(OH)_2 + CO_2 \rightarrow CaCO_3 + H_2O$$

The water produced in this reaction is likewise undesirable and must be removed in another appropriate reaction. Moreover, in some types of nuclear reactor, the gaseous coolant may be additionally contaminated with water introduced into the gas by the steam generator or by the carbon of the reflector. This water must similarly be removed from the circulating gas.

Apparatus is already known in which two absorption filters are provided working in parallel and containing a packing of $Ca(OH)_2$ to remove from the gas stream that is to be purified the entrained $CO_2$ by converting the same into $CaCO_3$. The water that is simultaneously formed is absorbed in a subsequent $H_2O$ absorption filter which is packed with CaO. Only one of the two $CO_2$ absorption filters is introduced into the gas stream at a time whilst the other filter is reactivated by an abrupt increase in temperature followed by cooling. The introduction of the filters into the gas stream and their removal therefrom is controlled by a three-way valve which is electrically controlled. Apparatus of such a kind converts a considerable quantity of the $Ca(OH)_2$ used into $CaCO_3$ and the cleaning effect is high. However, the apparatus has two major drawbacks. First, the heating elements required for raising the temperature of the exhausted filters are highly stressed by the continuous heating and cooling, so that their life is short. Second, the use of an electrically controlled three-way valve is difficult in a large-scale industrial plant.

It is therefore the object of the present invention to provide a method of removing the $CO_2$ and $H_2O$ from a stream of gas, which is just as effective and permits the same cleaning effect to be achieved as in conventional apparatus, but which at the same time avoids the above-mentioned drawbacks. Moreover, it is desirable even further to improve the percentage utilisation of the absorption filters. With this end in view the present invention consists in providing three absorption filter elements whereof the first initially contains a packing of granular $Ca(OH)_2$ and the second and third filter elements contain a packing of CaO, the method comprising initially passing the gas stream sequentially through the first and second filter elements and operating these respectively as a $CO_2$ absorption filter in which the $Ca(OH)_2$ is converted into $CaCO_3$ and as an $H_2O$ absorption filter and during such operation keeping the third filter element disconnected and in reserve, the method further comprising disconnecting the gas stream from the first filter element when this is exhausted and then connecting the second and third filter elements so that the gas stream passes sequentially through them with the result that the second filter now acts as a $CO_2$ absorption filter and the third filter element acts as an $H_2O$ absorption filter and, during this operation, the first filter element is re-charged with a fresh CaO packing and held in reserve to act as an $H_2O$ absorption filter when the second filter element is exhausted and replaced as a $CO_2$ absorption filter by the third filter element.

In the method according to the invention a three-way valve in the gas entry duct can be dispensed with and a sudden surge-like increase in temperature followed by cooling for the purpose of reactivating the $CO_2$-filter is not needed, so that the drawbacks this involves in known arrangements do not arise.

The $CO_2$-absorbing packing consists of an extremely reactive $Ca(OH)_2$ and the $CO_2$ absorption filter is initially operated at a working temperature of 180° C. which is raised by 10 to 20° C. increments in the course of the process. The reason for this progressive temperature rise is that after the conversion of about 2.9% of the $Ca(OH)_2$ to $CaCO_3$, a thin film of $CaCO_2$ will have formed which will envelop the grain of the absorbent packing and thereby prevent a continued reaction of the $CO_2$ with the $Ca(OH)_2$. At this stage the filter is therefore for the time being saturated. However, if the temperature of the $CO_2$-filter is now raised by about 15° C., and maintained until saturation point is reached again, the rise in vapour pressure associated with the increase in temperature is sufficient to re-open the pores inside the packing grains which had been choked by the $CaCO_3$ that had formed. Consequently fresh $Ca(OH)_2$ is again exposed. When more of the $Ca(OH)_2$ has reacted and the pores of the grains have again become choked with $CaCO_3$, a fresh temperature rise accompanied by an increase in vapour pressure again exposes fresh $Ca(OH)_2$ and the $CO_2$-filter continues to function satisfactorily as before. These temperature increments can be continued until a temperature of about 400° C. has been reached, at which stage about 70% of the $Ca(OH)_2$ will have reacted.

The $H_2O$-filter which follows the $CO_2$-filter must contain an absorbent which even at the elevated temperatures will not release the absorbed water. Moreover, the reaction product of the absorbent with $H_2O$ must not be a gas, a liquid or an aggressive chemical compound, as in the case in the majority of known chemical drying agents. The best packing material has been found to be a CaO which has not been produced in the manner the usual commercial grade of CaO is produced, namely from $CaCO_3$ by calcining the same, but from $Ca(OH)_2$ by the following reaction:

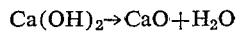

The CaO that is obtained in this way is far superior to a CaO obtained from $CaCO_3$ in so far as its reactivity with water is concerned.

The absorbent in the $H_2O$-filter reacts with the water that is to be removed from the gas according to the reaction

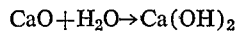

Up to 80% of the CaO in the $H_2O$-filter is thus converted to $Ca(OH)_2$. Advantage can be taken of this reaction scheme in the proposed method by re-using exhausted $H_2O$-filters as $CO_2$-filters and thus utilising the absorption filters twice. To this end three filters are provided for inter-position in the circulated gas stream of which two contain a CaO-packing when the process begins, whereas the third contains $Ca(OH)_2$ grains. One of the filters containing a CaO-charge is first kept in reserve, whereas the other is connected into the gas stream as an $H_2O$-filter on the downstream side of the $CO_2$-filter. The $CO_2$-filter extracts the $CO_2$ from the gas that is to be cleaned but releases water, the charge of $Ca(OH)_2$ contained in this filter being converted in stages to $CaCO_3$ as the temperature is raised in consecutive increments up to 400° C. Meanwhile the CaO in the $H_2O$-filter has been converted to $Ca(OH)_2$ by taking the water out of the gas, so that when the $CO_2$ breaks through the $CO_2$-filter the $H_2O$-filter can undertake the functions of the $CO_2$-filter. The exhausted filter is taken out of the circulating gas stream, provided with a fresh charge of CaO and held in reserve. Meanwhile the filter which had been in reserve is operated as the $H_2O$-filter. When the absorption filter now operating as a $CO_2$-filter breaks through upon reaching a temperature of 400° C., the next $H_2O$-filter takes its place and the filter which is now in reserve is introduced into the gas stream as an $H_2O$-filter. It will thus be understood that each filter is used twice.

In the method proposed by the invention the working temperature of the $CO_2$-filter is conveniently raised in stages under the control of a $CO_2$-meter connected to the gas duct on the downstream side of the absorption filter functioning as the $CO_2$-filter. The $CO_2$-meter continuously measures the concentration of $CO_2$ on the downstream side of the $CO_2$-filter and activates a temperature-regulating device as soon as the filter reaches the point of saturation, said temperature regulator raising the temperature of the filter in the above described manner. For monitoring the $H_2O$-concentration in the gas stream on the downstream side of the $H_2O$-filter a hygrometer may be built into the gas duct.

An embodiment of the invention will now be described by way of example with reference to the accompanying drawing which illustrates diagrammatically filtration apparatus for carrying out the invention.

Referring now to the drawing there is shown a first absorption filter 1, a second absorption filter 2 and a third absorption filter 3. All three filters 1, 2 and 3 are connected in parallel both at their inlet and outlet ends to the flow and return parts respectively of a gas circulating pipe 4.

The first filter 1 contains a packing of $Ca(OH)_2$ grains. An inlet stop valve 5 is provided at the filter inlet and an outlet valve 6 at the filter outlet. Upstream of the outlet stop valve 6, the first filter outlet is connected by a conduit 7 to the inlet of the second filter 2. Downstream of the inlet valve 5, the filter inlet is connected by a conduit 8 to the outlet of the third filter 3. Stop valves 9 and 10 are provided in conduits 7 and 8 respectively. Thus it will be seen that (i) by closing stop valves 9 and 10 and opening valves 5 and 6, the filter 1 will be connected to the gas circulating pipe 4, (ii) by closing valve 6 and opening valve 9, the first filter outlet will be connected to the second filter inlet, the first filter inlet remaining connected to the gas pipe 4, (iii) by closing valve 5 and opening valve 10 and by opening valve 6 and closing valve 9, the first filter inlet will be connected to the third filter outlet and first filter outlet will be connected to the gas pipe 4, and (iv) by closing valves 5, 6, 9 and 10 the first filter 1 may be isolated.

The second filter 2 is filled with a packing of CaO which has been produced from $Ca(OH)_2$ and which operates as an $H_2O$ absorption filter. An inlet stop valve 11 is provided between the second filter inlet and the gas pipe 4. An outlet stop valve 12 is provided between the second filter outlet and the gas pipe 4. Upstream of the outlet stop valve 12, the second filter outlet is connected by a conduit 13 to the third filter inlet. A stop valve 14 is provided in the conduit 13. In a similar manner to that described in the preceding sentence in relation to the first filter 1, the second filter 2 can be connected (i) at its inlet and outlet to the gas circulating pipe 4, (ii) at its outlet to the third filter inlet and at its inlet to the gas circulating pipe 4, (iii) at its outlet to the gas circulating pipe 4 and at its outlet to the first filter outlet pipe, and (iv) it may be isolated.

The third filter 3 also contains a packing of CaO which has been produced from $Ca(OH)_2$. An inlet stop valve 15 is provided between the third filter inlet and the gas pipe 4. An outlet stop valve 16 is provided between the third filter outlet and the gas pipe 4. In a similar manner to that described in relation to the first filter 1, the third filter 3 can be connected (i) at its inlet and outlet to the gas circulating pipe 4, (ii) at its outlet to the first filter inlet and at its inlet to the gas circulating pipe 4, (iii) at its outlet to the gas circulating pipe 4 and at its inlet to the second filter outlet and (iv) it may be isolated.

A stop valve 17 is provided in the gas circulating pipe 4 between the flow and return parts thereof, i.e., between the inlet connections and the outlet connections to the three absorption filters 1, 2 and 3.

Each of the three absorption filters 1, 2 and 3 is provided with a heating element 18. The heating elements 18 are separately controllable by a temperature regulating unit 19. A $CO_2$-meter 20 is connected by a connecting line 21 to the temperature regulating unit 19 to control this unit. The three filter outlets are connected, upstream of the outlet valves to the $CO_2$-meter 20. Stop valves 23, 24 and 25 are provided to disconnect the first, second and third filters respectively from a collecting pipe 22 leading to the $CO_2$-meter 20. An isolating stop valve 26 isolates the $CO_2$-meter from the collecting pipe 22 and from all the filters. The return end of the gas circulating pipe 4 is finally connected by a short branch pipe controlled by a valve 28 to a hygrometer 27.

To start with, all the valves are so adjusted that the third filter 18 is isolated and the gas that is to be purified flows from the flow part of the pipe 4 through the first absorption filter 1, and from the first filter outlet to the second filter inlet and thence to the return part of the pipe 4. The $CO_2$ is retained in the first absorption filter 1 and the water in the second absorption filter 2. The $CO_2$-concentration in the gas leaving the first filter 1 is continuously monitored by the $CO_2$-meter 20 which automatically activates the temperature regulator 19 when the first filter 1 reaches saturation point. The starting temperature of the first filter 1 is 180° C. and is raised in stages, from 180° C., in increments of about 15°, to a final temperature of 400° C. when the $CO_2$ finally breaks through the first filter 1.

The valves are then reset in such a way that the first absorption filter 1 is isolated and the gas is instead first admitted from the flow part of the pipe 4 into the inlet of the second absorption filter 2, from the second filter outlet into the inlet of the third absorption filter 3. The second and third absorption filters now function as $CO_2$ and $H_2O$ absorption filters respectively. Meanwhile the exhausted first filter 1 is charged with a fresh CaO packing.

When the second absorption filter 2 is finally exhausted at a temperature of 400° C., the third absorption filter 3 takes its place and functions as the $CO_2$-filter, whereas the first filter 1 is brought into operation as an $H_2O$-filter. Hence each filter consecutively performs two functions, the reaction product in the $H_2O$-filter being used as absorbent when this filter is taken into use as the $CO_2$-filter.

We claim:

1. A method of removing $CO_2$ and $H_2O$ from a gas stream using three absorption filter elements in which a first filter element initially contains a packing of $Ca(OH)_2$ and a second and a third filter elements initially contain a packing of CaO comprising:

(A) initially passing the gas stream sequentially through said first and said second filter elements, and
  (1) operating said first filter element as a $CO_2$ absorption filter whereby heated $Ca(OH)_2$ acts to absorb $CO_2$ and is thereby converted to $CaCO_3$,
  (2) operating said second filter element as an $H_2O$ absorption filter whereby CaO acts to absorb $H_2O$ and is thereby converted to $Ca(OH)_2$, and
  (3) maintaining said third filter element in reserve;

(B) disconnecting said gas stream from said first filter element when it is exhausted as a $CO_2$ absorber; and then (C) passing said gas stream sequentially through said second and said third filter elements, and
  (1) operating said second filter element, which now contains $Ca(OH)_2$, as a $CO_2$ absorption filter whereby heated $Ca(OH)_2$ acts to absorb $CO_2$ and is thereby converted to $CaCO_3$,
  (2) operating said third filter element as an $H_2O$ absorption filter whereby CaO acts to absorb $H_2O$ and is thereby converted to $Ca(OH)$, and
  (3) charging said first filter element with a CaO packing and maintaining it in reserve whereby it may subsequently be used as an $H_2O$ absorption filter and, after said second filter element is exhausted as a $CO_2$ absorber, employed in conjunction with said third filter element operated as a $CO_2$ absorption filter.

2. A method according to claim 1 further comprising raising the temperature of the filter acting as a $CO_2$ filter above its starting value, as it becomes increasingly exhausted to raise the absorption capacity thereof.

3. A method according to claim 2 wherein the temperature of the said filter acting as a $CO_2$ filter is raised in a plurality of stages.

4. A method as claimed in claim 3 wherein the temperature is raised from 180° C. to 400° C. in stages of about 10 to 20° C.

5. The method of claim 1 in which said filter element which is acting as a $CO_2$ filter is operated at a temperature of at least 180° C.

6. The method of claim 3 comprising connecting the outlet side of the filter element which is acting as a $CO_2$ filter to a $CO_2$ meter which operates to measure the $CO_2$ content of the gas stream at the outlet side of the $CO_2$ filter, said $CO_2$ meter operating through a temperature regulator whereby the temperature of said $CO_2$ filter is increased when a predetermined amount of $CO_2$ is present in said gas stream at the outlet side of said $CO_2$ filter.

References Cited
UNITED STATES PATENTS 2,332,887   10/1943   Biederbeck et al. _____ 23—2
3,100,685   8/1963   Duffey _____ 23—2 X OSCAR R. VERTIZ, Primary Examiner E. C. THOMAS, Assistant Examiner U.S. Cl. X.R.

23—66